United States Patent [19]

Gutierrez

[11] Patent Number: 5,565,128
[45] Date of Patent: Oct. 15, 1996

[54] LUBRICATING OIL MANNICH BASE DISPERSANTS DERIVED FROM HEAVY POLYAMINE

[75] Inventor: Antonio Gutierrez, Mercerville, N.J.

[73] Assignee: Exxon Chemical Patents Inc, Linden, N.J.

[21] Appl. No.: 322,715

[22] Filed: Oct. 12, 1994

[51] Int. Cl.$^6$ ................................. C01M 159/16
[52] U.S. Cl. ........................ 508/542; 525/333.7
[58] Field of Search ............................ 252/515 R

[56] References Cited

U.S. PATENT DOCUMENTS

| | | | |
|---|---|---|---|
| 3,442,808 | 5/1969 | Traise et al. | 252/49.6 |
| 3,539,633 | 11/1970 | Piasek et al. | 260/570.5 |
| 3,634,515 | 1/1972 | Piasek et al. | 260/570.5 PA |
| 3,649,229 | 3/1972 | Otto | 44/73 |
| 3,798,165 | 3/1974 | Piasek et al. | 252/51.5 R |
| 3,798,247 | 3/1974 | Piasek et al. | 260/404.5 |
| 4,152,499 | 5/1979 | Boerzel et al. | 526/52.4 |
| 4,354,950 | 10/1982 | Hammond et al. | 252/51.5 A |
| 4,665,208 | 5/1987 | Welborn et al. | 556/179 |
| 4,871,705 | 10/1989 | Hoel | 502/117 |
| 4,927,551 | 5/1990 | Erdman et al. | 252/42.7 |
| 4,937,299 | 6/1990 | Ewen et al. | 526/119 |
| 4,938,881 | 7/1990 | Ripple et al. | 252/32.7 E |
| 4,952,739 | 8/1990 | Chen | 585/18 |
| 5,017,299 | 5/1991 | Gutierrez et al. | 252/51.5 R |
| 5,017,714 | 5/1991 | Wellborn | 556/12 |
| 5,053,152 | 10/1991 | Steckel | 252/51.5 R |
| 5,055,438 | 10/1991 | Canich | 502/117 |
| 5,057,475 | 10/1991 | Canich et al. | 502/104 |
| 5,064,802 | 11/1991 | Stevens et al. | 502/155 |
| 5,096,867 | 3/1992 | Canich | 502/103 |
| 5,114,435 | 5/1992 | Abramo et al. | 44/348 |
| 5,120,867 | 6/1992 | Welborn | 556/12 |
| 5,153,157 | 10/1992 | Htlaky et al. | 502/117 |
| 5,160,648 | 11/1992 | Steckel | 252/47.5 |
| 5,164,101 | 11/1992 | Brownawell et al. | 252/25 |
| 5,171,466 | 12/1992 | Korosec | 252/51.5 A |
| 5,186,851 | 2/1993 | Gutierrez et al. | 252/49.006 |
| 5,198,401 | 3/1993 | Turner et al. | 502/155 |
| 5,227,440 | 7/1993 | Canich et al. | 526/129 |
| 5,230,714 | 7/1993 | Steckel | 44/432 |
| 5,241,003 | 8/1993 | Degonia et al. | 525/123 |
| 5,241,025 | 8/1993 | Hlatky et al. | 526/129 |
| 5,268,115 | 12/1993 | Gutierrez et al. | 252/51.5 R |
| 5,334,321 | 8/1994 | Harrison et al. | 252/51.5 |
| 5,334,775 | 8/1994 | Gutierrez et al. | 568/791 |

FOREIGN PATENT DOCUMENTS

| | | | |
|---|---|---|---|
| 129368 | 12/1984 | European Pat. Off. | C08F 10/00 |
| 277003 | 8/1988 | European Pat. Off. | C08F 4/64 |
| 277004 | 8/1988 | European Pat. Off. | C08F 4/64 |
| 420436 | 4/1991 | European Pat. Off. | C07F 7/00 |
| 475609 | 3/1992 | European Pat. Off. | C10M 133/56 |
| 520732 | 12/1992 | European Pat. Off. | C08F 10/00 |
| WO91/04257 | 4/1991 | WIPO | C07F 7/00 |
| WO92/00333 | 1/1992 | WIPO | C08F 4/76 |
| WO93/08221 | 4/1993 | WIPO | C08F 10/00 |
| WO93/08199 | 4/1993 | WIPO | C07F 7/28 |

OTHER PUBLICATIONS

"Technical Bulletin Union Carbide Corporation", pp. 1–47 (date N/A).

"Ethyleneamines (1994) Brochure from Union Carbide Corporation" (month N/A).

"Ethyleneamines (1991) Dow Chemical Company" pp. 1–44 (month N/A).

*Primary Examiner*—Ellen M. McAvoy
*Attorney, Agent, or Firm*—Theodore V. Kowalchyn

[57] ABSTRACT

An oil-soluble lubricating oil additive useful as a dispersant, comprising Mannich Base condensates of an alkyl (hydrocarbon or polymer) substituted hydroxy aromatic compound with an aldehyde and a heavy polyamine. A heavy polyamine is a mixture of polyalkylenepolyamines comprising small amounts of lower polyamine oligomers such as tetraethylene pentamine and pentahexamine but primarily oligomers with 7 or more nitrogens, 2 or more primary amines per molecule, and more extensive branching than conventional polyamine mixtures.

20 Claims, No Drawings

LUBRICATING OIL MANNICH BASE DISPERSANTS DERIVED FROM HEAVY POLYAMINE

FIELD OF THE INVENTION

The invention relates to dispersant additives comprising Mannich Base condensates of an alkyl (hydrocarbon or polymer) substituted hydroxy aromatic compound with an aldehyde and with "heavy polyamines". "Heavy polyamine" as referred to herein includes mixtures of higher oligomers of polyalkylene, e.g. polyethylene, amines containing, e.g., essentially no tetraethylene pentamine, small amounts of pentaethylenehexamine but primarily oligomers with 7 or more nitrogens, 2 or more primary amines per molecule and more branching than conventional polyamine mixtures. Use of heavy polyamine allows for incorporation of greater amounts of nitrogen into the dispersant molecule than prior art amines and thusly, superior sludge dispersancy properties are obtained. The Mannich Base dispersants disclosed herein are useful as additives in fuel and lubricating oils.

BACKGROUND OF THE INVENTION

U.S. Ser. No. 273,294 entitled "Lubricating Oil Succinimide Dispersants Derived from Heavy Polyamine", filed Jul. 11, 1994, discloses imidization of functionalized hydrocarbons or polymers with heavy polyamine and is incorporated by reference herein.

U.S. Ser. No. 261,554 entitled "Lubricating Oil Dispersants Derived from Heavy Polyamine", filed Jun. 17, 1994, discloses amidation (derivatization) of polymers functionalized by the Koch reaction with heavy polyamine and is incorporated by reference herein.

U.S. Ser. No. 261,507, entitled "Amidation of Ester Functionalized Hydrocarbon Polymers", filed Jun. 17, 1994, discloses a preferred amidation process for polymers functionalized by the Koch reaction and use of heavy polyamine therein and is incorporated by reference herein.

Mannich Base condensation products are used as dispersants in lubricating oil applications. They are typically prepared by reacting an alkyl substituted phenol, formaldehyde and a polyalkylene polyamine.

U.S. Pat. No. 5,017,299 and the divisional thereof, U.S. Pat. No. 5,186,851, discloses dispersants comprising Mannich Base condensates of an alkyl substituted hydroxy aromatic compound with formaldehyde and an amine, wherein the alkyl moiety of the aromatic compound is derived from at least one ethylene alpha-olefin copolymer of 300 to 10,000 number average molecular weight, wherein at least about 30 percent of the polymer's chains contain terminal ethenylidene unsaturation and are incorporated by reference herein.

U.S. Pat. No. 3,442,808 discloses lubricating oil additives prepared by reacting an alkenyl succinic anhydride with a Mannich condensation product prepared by condensing alkyl substituted phenol, formaldehyde and polyalkylene polyamine.

U.S. Pat. No. 4,354,950 discloses a lubricating oil additive prepared by reacting a hydrocarbyl substituted succinic anhydride with an amino phenol to produce an intermediate N-(hydroxyaryl) hydrocarbyl succinimide. This intermediate is then reacted with an alkylene diamine or polyalkylene polyamine and an aldehyde in a Mannich Base reaction.

Polyalkenyl succinimides are a widely used class of dispersants for lubricant and fuels applications. They are prepared by the reaction of, for example, polyisobutylene with maleic anhydride to form polyisobutenylsuccinic anhydride, and a subsequent condensation reaction with polyethylene amines.

EP-A 0 475 609 A1 discloses the use of "heavy polyamine" which is disclosed to be a mixture of polyethyleneamines sold by Union Carbide Co. under the designation Polyamine HPA-X.

U.S. Pat. No. 5,230,714 discloses the use of "polyamine bottoms" derived from an alkylene polyamine mixture. "Polyamine bottoms" are characterized as having less than 2, usually less than 1% by weight of material boiling below about 200° C. In the case of ethylene polyamine bottoms, the bottoms were disclosed to contain less than about 2% by weight total diethylene triamine (DETA) or triethylene tetraamine (TETA). A typical sample of such ethylene polyamine from Dow Chemical Company, designated as "E-100" was disclosed to have a percent nitrogen by weight of 33.15 and gas chromatography analysis showed it to contain about 0.93% "Light Ends" (DETA), 0.72% TETA, 21.74% tetraethylene pentamine and 76.61% pentaethylene hexamine and higher (by weight).

U.S. Pat. No. 4,938,881 similarly discloses the use of "polyamine bottoms".

U.S. Pat. No. 5,164,101 discloses the polybutenylsuccinimide of polyamines, wherein the polyamine has a specific formula.

U.S. Pat. No. 5,114,435 discloses a polyalkylenesuccinimide prepared from a polyalkylenesuccinnic acid or anhydride reacted with a polyalkylene polyamine of a specific formula. Hexaethylene heptamine is disclosed to be a suitable amine.

U.S. Pat. No. 4,927,551 discloses a polybutenyl succinnic anhydride reacted with Dow E-100 heavy polyamine (average Mw=303 available from Dow Chemical Company).

U.S. Pat. No. 5,241,003 discloses succinimides derived from amines of a specific formula. Various suitable low cost polyethylene polyamine mixtures are disclosed to be available under various trade designations such as "Polyamine H", "Polyamine 400", Dow Polyamine E-100" and "Dow S-1107".

U.S. Pat. No. 4,152,499 discloses isobutene polymer reacted with maleic anhydride and this adduct then converted into a lubricating oil additive by reaction with polyamines of a specific formula. Diethylenetriamine and triethylenetetramine are disclosed to be suitable amines.

U.S. Pat. No. 5,053,152 and the divisional thereof, U.S. Pat. No. 5,160,648, disclose condensates produced by the acid catalyzed condensation of an amine reactant with a hydroxy alkyl or hydroxy aryl reactant. The amine reactant is disclosed to be a high molecular weight extended polyamine.

U.S. Pat. No. 5,171,466 discloses dispersants formed by reacting an aliphatic hydrocarbyl substituted succinic acylating agent in which the hydrocarbyl substituent contains an average of at least 40 carbon atoms with a mixture consisting essentially of hydrocarbyl polyamines containing from 10 to 50 weight percent acyclic alkylene polyamines and 50 to 90 weight percent cyclic alkylene polyamines.

SUMMARY OF THE INVENTION

The present invention is an oil soluble dispersant additive composition comprising a condensation product obtained by the reaction of a) at least one alkyl-substituted hydroxy aromatic compound formed by the alkylation of at least one hydroxy aromatic compound (e.g., phenol) with at least one compound containing a carbon-carbon double bond selected from the group consisting of hydrocarbons and polymer, b) at least one aldehyde reactant (e.g., formaldehyde) and c) a heavy polyamine. The present invention is also a process for producing an oil soluble dispersant comprising the steps of a) contacting at least one alkyl-substituted hydroxy aromatic compound formed by the alkylation of at least one hydroxy aromatic compound with at least one compound containing a carbon-carbon double bond selected from the group consisting hydrocarbons and polymer with b) at least one aldehyde reactant and c) at least one heavy amine, under condensation conditions. Heavy polyamine comprises an average of at least about 7 nitrogens per molecule, a primary amine content of at least about 6.3 to about 8.5 milliequivalents of primary amine per gram and a total nitrogen content of at least about 32 wt. percent.

DETAILED DESCRIPTION OF THE INVENTION

The present invention relates to Mannich Base dispersant additives prepared by the reaction of an alkyl substituted hydroxy aromatic compound with an aldehyde and, such as formaldehyde, and with "heavy polyamines". "Heavy polyamine" as referred to herein includes a mixture of higher oligomers of polyalkylene, e.g. polyethylene, amines containing, e.g., essentially no tetraethylenepentamine, at most small amounts of pentaethylenehexamine, but primarily oligomers with more than 6 nitrogens and more branching than conventional polyamine mixtures. The Mannich Base dispersants disclosed herein are useful as additives in fuel and lubricating oils.

The alkyl-substituted hydroxy aromatic compounds are formed by contacting the selected compound containing a carbon-carbon double bond (e.g., hydrocarbon or polymer) and selected hydroxy aromatic compound (i.e., phenol) in the presence of a catalytically effective amount of at least one acidic alkylation catalyst under conditions effective to alkylate the aromatic group of the hydroxy aromatic compound. The alkylation catalyst is conventional and can comprise inorganic acids such as $H_3PO_4$, $H_2SO_4$, HF, $BF_3$, HF—$BF_3$ and the like. The acid catalyst can also comprise an acidic ion exchange resin having acidic groups adsorbed or absorbed thereon.

In addition, partially or completely dehydrated heteropoly catalysts can be used to alkylate hydroxy aromatic compounds with terminally unsaturated polymers, as disclosed in U.S. Pat. No. 5,334,775, which is incorporated herein by reference in its entirety for all purposes.

The heavy polyamine as the term is used herein contains more than six nitrogens per molecule, but preferably polyamine oligomers containing 7 or more nitrogens per molecule and with 2 or more primary amines per molecule. The heavy polyamine comprises more than 28 wt. % (e.g. >32 wt. %) total nitrogen and an equivalent weight of primary amine groups of 120–160 (e.g., 125–140) grams per equivalent. Commercial dispersants are based on the reaction of carboxylic acid moieties with a polyamine or a hydroxy aromatic compound with formaldehyde and polyamines such as tetraethylenepentamine (TEPA) with five nitrogens per molecule. Commercial TEPA is a distillation cut and contains oligomers with three and four nitrogens as well. Other commercial polyamines known generically as PAM, contain a mixture of ethylene amines where TEPA and pentaethylene hexamine (PEHA) are the major part of the polyamine, usually less than about 80%. Typical PAM is commercially available from suppliers such as the Dow Chemical Company under the trade name E-100 or from the Union Carbide Company as HPA-X. This mixture typically consists of less than 1.0 wt. % low molecular weight amine, 10–15 wt. % TEPA, 40–50 wt. % PEHA and the balance hexaethyleneheptamine (HEHA) and higher oligomers. Typically PAM has 8.7–8.9 milliequivalents of primary amine per gram (an equivalent weight of 115 to 112 grams per equivalent of primary amine) and a total nitrogen content of about 33–34 wt. %.

It has been discovered that heavier cuts of PAM oligomers with practically no TEPA and only very small amounts of PEHA but containing primarily oligomers with more than 6 nitrogens and more extensive branching, produce dispersants with improved dispersancy when compared to products derived from regular commercial PAM under similar conditions with the same polymer backbones. An example of one of these heavy polyamine compositions is commercially available from the Dow Chemical Company under the trade name of Polyamine HA-2.

HA-2 is prepared by distilling out the lower boiling polyethylene amine oligomers (light ends) including TEPA. The TEPA content is less than 1 wt. %. Only a small amount of PEHA, less than 25 wt. %, usually 5–15 wt. %, remains in the mixture. The balance is higher nitrogen content oligomers usually with a greater degree of branching. The heavy polyamine preferably comprises essentially no oxygen.

Typical analysis of HA-2 gives primary nitrogen values of about 7.8 milliequivalents (meq) (e.g. 7.7–7.8) of primary amine per gram of polyamine. This calculates to be about an equivalent weight (EW) of 128 grams per equivalent (g/eq). The total nitrogen content is about 32.0–33.0 wt. %. Commercial PAM analyzes for 8.7–8.9 meq of primary amine per gram of PAM (115 to 112 g/eq) and a nitrogen content of about 33 to about 34 wt. %.

The dispersants of the present invention are an improvement over other Mannich Base dispersants because of their effectiveness and their ability to provide enhanced lubricating oil dispersancy, as exhibited by their enhanced sludge control properties.

For example, as the molecular weight of a dispersant backbone is increased, the polar segment of the molecule becomes the limiting factor in dispersancy performance with polyamine systems of the prior art such as triethylenetetramine and tetraethylenepentamine. Increasing the stoichiometric ratio of amine to polymer raises the nitrogen content, but results in significant levels of free unreacted polyamine which is detrimental to diesel engine and elastomer seal performance.

The present invention relates to the reaction of a heavy polyamine and a aldehyde reactant with a alkyl-substituted hydroxy aromatic compound formed by the alkylation of a hydroxy aromatic compound with a compound containing a carbon-carbon double bond consisting of hydrocarbons or polymers wherein the polymer backbones have a number average molecular weight (Mn) of greater than 300 (i.e., 300 to 20,000). Preferably 800 to 7,500. Most preferably 1000 to 3000. For use as multifunctional viscosity modifiers (MFVM's) the polymers have an Mn of 20,000 to 500,000. Preferably about 30,000, most preferably about 50,000 to about 100,000. The preferred number average molecular weight depends on the properties of the particular backbone.

For example, for ethylene alpha olefin copolymers, the preferred molecular weight is 1500 to 5000 (e.g. 2000–4000). For polybutenes the preferred molecular weight is 900 to 2000.

Dispersants made from backbones less than 300 Mn are useful in 2-cycle engine oils. The present invention includes dispersants useful for this application.

Suitable Hydrocarbons and Polymers

The preferred hydrocarbons or polymers employed in this invention include homopolymers, interpolymers or lower molecular weight hydrocarbons. The preferred polymers comprise at least one $C_3$ to $C_{28}$ alpha-olefin having the formula $H_2C=CHR^1$ wherein $R^1$ is straight or branched chain alkyl radical comprising 1 to 26 carbon atoms and wherein the polymer contains carbon-to-carbon unsaturation, preferably a high degree of terminal ethenylidene unsaturation. Preferably, the polymers employed in this invention comprise interpolymers of ethylene and at least one alpha-olefin of the above formula, wherein $R^1$ is alkyl of from 1 to 18 carbon atoms, and more preferably is alkyl of from 1 to 8 carbon atoms, and more preferably still 1 to 2 carbon atoms. Therefore, useful alpha-olefin monomers and comonomers include, for example, propylene, butene-1, hexene-1, octene-1, 4-methylpentene-1, decene-1, dodecene-1, tridecene-1, tetradecene-1, pentadecene-1, hexadecene-1, heptadecene-1, octadecene- 1, nonadecene-1, and mixtures thereof (e.g., mixtures of propylene and butene-1, and the like). Exemplary of such polymers are propylene homopolymers, butene-1 homopolymers, ethylene-propylene copolymers, ethylene-butene-1 copolymers and the like, wherein the polymer contains at least some terminal and/or internal unsaturation. Preferred polymers are unsaturated copolymers of ethylene and propylene and ethylene and butene-1. The interpolymers of this invention may contain a minor amount, e.g. 0.5 to 5 mole % of a $C_4$ to $C_{18}$ non-conjugated diolefin comonomer. However, it is preferred that the polymers of this invention comprise only alpha-olefin homopolymers, interpolymers of alpha-olefin comonomers and interpolymers of ethylene and alpha-olefin comonomers. The molar ethylene content of the polymers employed in this invention is preferably in the range of 20 to 80%, and more preferably 30 to 70%. When propylene and/or butene-1 are employed as comonomer(s) with ethylene, the ethylene content of such copolymers is most preferably between 45 and 65%, although higher or lower ethylene contents may be present.

The polymers employed in this invention generally possess a Mn of 300 to 10,000, preferably 800 to 7,500; more preferably 1,000 to 3,000 (e.g., 1,500 to 2,500). The Mn for such polymers can be determined by several known techniques such as size exclusion chromatography (also known as gel permeation chromatography (GPC)) which also provides molecular weight distribution information.

Suitable polymers will typically have a narrow molecular weight distribution (MWD) also referred to as polydispersity, as determined by the ratio of weight average molecular weight (Mw) to (Mn). Polymers having a Mw/Mn of less than 5, preferably less than 4, are most desirable. Suitable polymers have a polydispersity of, for example, 1 to 5. Consequently, such polymers generally possess an intrinsic viscosity (as measured in tetralin at 135° C.) of 0.025 to 0.9 dl/g, preferably 0.05 to 0.5 dl/g, most preferably 0.075 to 0.4 dl/g. The polymers employed in this invention preferably exhibit a degree of crystallinity such that they are essentially amorphous.

Low molecular weight polymers are polymers having Mn less than 20,000, preferably 300 to 20,000, more preferably 800 to 10,000 (e.g. 9,000 to 7,500) and most preferably from 1,000 to 3,000. The number average molecular weights are measured by vapor phase osmometry or GPC as discussed above. Low molecular weight polymers are useful in forming dispersants for lubricant additives.

High molecular weight polymers Mn's ranging from 20,000 to 500,000, preferably 25,000 to 100,000; and more preferably, from 30,000 to 100,000 (e.g., 50,000 to 100,000) are useful for multifunctional viscosity modifiers for lubricating oil compositions.

Specific examples of terminal and internal olefin monomers which can be used to prepare the polymers of the present invention according to conventional, well-known polymerization techniques include ethylene; propylene; butene-1; butene-2; isobutene; pentene-1; etc.; propylenetetramer; diisobutylene; isobutylene trimer; butadiene-1,2; butadiene-1,3; pentadiene-1,2; pentadiene-1,3; etc.

Useful polymers include alpha-olefin homopolymers and interpolymers, and ethylene alpha-olefin copolymers and terpolymers. Specific examples of polyalkenes include polypropylenes, polybutenes, ethylene-propylene copolymers, ethylene-butene copolymers, propylene-butene copolymers, styrene-isobutene copolymers, isobutene-butadiene- 1,3 copolymers, etc., and terpolymers of isobutene, styrene and piperylene and copolymers of 80% of ethylene and 20% of propylene. A useful source of polymers are the poly(isobutene)s obtained by polymerization of C4 refinery stream having a butene content of about 35 to about 75% by wt., and an isobutene content of about 30 to about 60% by wt., in the presence of a Lewis acid catalyst such as aluminum trichloride or boron trifluoride.

Also useful are the high molecular weight poly-n-butenes of U.S. Ser. No. 992,871 filed Dec. 17, 1992.

A preferred source of monomer for making poly-n-butenes is petroleum feedstreams such as Raffinate II. These feedstocks are disclosed in the art such as in U.S. Pat. No. 4,952,739.

The polymers employed in this invention, which preferably are further characterized in that up to 95% and more of the polymer chains possess terminal ethenylidene-type unsaturation, may be prepared by polymerizing alpha-olefin monomer, or mixtures of alpha-olefin monomers, or mixtures comprising ethylene and at least one $C_3$ to $C_{28}$ alpha-olefin monomer, in the presence of a catalyst system comprising at least one metallocene (e.g., a cyclopentadienyl-transition metal compound) and an alumoxane compound. Interpolymers of this latter type, which are preferred interpolymers for use in the invention, may be characterized by the formula POLY—$C(R^1)$=$CH_2$ wherein $R^1$ is $C_1$ to $C_{26}$ alkyl, preferably $C_1$ to $C_{18}$ alkyl, more preferably $C_1$ to $C_8$ alkyl, and most preferably $C_1$ to $C_2$ alkyl, (e.g., methyl or ethyl) and wherein POLY represents the polymer chain. The chain length of the $R^1$ alkyl group will vary depending on the comonomer(s) selected for use in the polymerization. A minor amount of the polymer chains can contain terminal ethenyl, i.e.,. vinyl, unsaturation, i.e. POLY—CH=$CH_2$, and a portion of the polymers can contain internal monounsaturation, e.g. POLY—CH=$CH(R^1)$, wherein $R^1$ is as defined above.

In the preferred polymers contemplated for use in this invention, at least about 30% of the polymer chains possess terminal ethenylidene unsaturation. Preferably at least 50%, more preferably at least 60%, and most preferably at least 75% (e.g. 75–98%), of such polymer chains exhibit terminal ethenylidene unsaturation. The percentage of polymer chains exhibiting terminal ethenylidene unsaturation may be determined by FTIR spectroscopic analysis, titration, or $C^{13}$NMR.

The preferred terminally unsaturated interpolymer to be used in this invention may be prepared by known metallocene chemistry. Preferred polymers to be used in this invention also may be prepared as described in U.S. Ser. Nos. 992,871; 992,690; and 992,192, all filed Dec. 17, 1992.

The preferred interpolymers can be prepared by polymerizing monomer mixtures comprising ethylene in combination with other monomers such as alpha-olefins having from 3 to 28 carbon atoms (and preferably from 3 to 4 carbon atoms, i.e., propylene, butene-1, and mixtures thereof) in the presence of a catalyst system comprising at least one metallocene (e.g., a cyclopentadienyl-transition metal compound) and an alumoxane compound. The comonomer content can be controlled through the selection of the metallocene catalyst component and by controlling the partial pressure of the various monomers. Most preferably, the polymers used in this invention are substantially free of ethylene homopolymer.

The catalyst is preferably a bulky ligand transition metal compound. The bulky ligand may contain a multiplicity of bonded atoms, preferably carbon atoms, forming a group which may be cyclic with one or more optional heteroatoms. The bulky ligand may be a cyclopentadienyl derivative which can be mono- or polynuclear. One or more bulky ligands may be bonded to the transition metal ("Group" refers to an identified group of the Periodic Table of Elements, comprehensively presented in "Advanced Inorganic Chemistry", F. A. Cotton, G. Wilkinson, Fifth Edition, 1988, John Wiley & Sons). Other ligands may be bonded to the transition metal, preferably detachable by a cocatalyst such as a hydrocarbyl or halogen leaving group. The catalyst is derivable from a compound of the formula

wherein L is the bulky ligand, X is the leaving group, M is the transition metal and m and n are such that the total ligand valency corresponds to the transition metal valency. Preferably the catalyst is four coordinate such that the compound is ionizable to a $1^+$ valency state.

The ligands L and X may be bridged to each other and if two ligands L and/or X are present, they may be bridged. The metallocenes may be full-sandwich compounds having two ligands L which are cyclopentadienyl groups or half-sandwich compounds having one ligand L only which is a cyclopentadienyl group.

For the purposes of this patent specification the term "metallocene" is defined to contain one or more cyclopentadienyl moiety in combination with a transition metal of the Periodic Table of Elements. In one embodiment the metallocene catalyst component is represented by the general formula $(Cp)_mMR_nR'_p$ wherein Cp is a substituted or unsubstituted cyclopentadienyl ring; M is a Group IV, V or VI transition metal; R and R' are independently selected halogen, hydrocarbyl group, or hydrocarboxyl groups having 1–20 carbon atoms; m=1–3, n=0–3, p=0–3, and the sum of m+n+p equals the oxidation state of M. In another embodiment the metallocene catalyst is represented by the formulas:

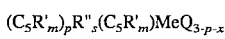

and

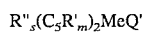

wherein Me is a Group IV, V, or VI transition metal $C_5R'_m$ is a substituted cyclopentadienyl each R', which can be the same or different is hydrogen, alkenyl aryl alkaryl or arylalkyl radical having from 1 to 20 carbon atoms or two carbon atoms joined together to form a part of a $C_4$ to $C_6$ ring, R" is one or more or a combination of a carbon, a germanium, a silicon, a phosphorous or a nitrogen atom containing radical substituting on and bridging two $C_5R'_m$ rings or bridging one $C_5R'_m$ ring back to Me, when p=0 and x=1 otherwise x is always equal to 0, each Q which can be the same or different is an aryl alkyl, alkenyl, alkaryl, or arylalkyl radical having from 1 to 20 carbon atoms or halogen, Q' is an alkylidene radical having from 1 to 20 carbon atoms, s is 0 or 1 and when s is 0, m is 5 and p is 0, 1 or 2 and when s is 1, m is 4 and p is 1.

Various forms of the catalyst system of the metallocene type may be used in the polymerization process of this invention. Exemplary of the development of metallocene catalysts in the art for the polymerization of ethylene is the disclosure of U.S. Pat. No. 4,871,705 to Hoel, U.S. Pat. No. 4,937,299 to Ewen et al., and EP-A-0 129 368 published Jul. 26, 1989, and U.S. Pat. Nos. 5,017,714 and 5,120,867 to Welborn, Jr. These publications teach the structure of the metallocene catalysts and include alumoxane as the cocatalyst. There are a variety of methods for preparing alumoxane, one of which is described in U.S. Pat. No. 4,665,208.

For the purposes of this patent specification, the terms "cocatalysts or activators" are used interchangeably and are defined to by any compound or component which can activate a bulky ligand transition metal compound. In one embodiment the activators generally contain a metal of Group II and III of the Periodic Table of Elements. In the preferred embodiment, the bulky transition metal compound are metallocenes, which are activated by trialkylaluminum compounds, alumoxanes both linear and cyclic, or ionizing ionic activators or compounds such as tri(n-butyl) ammonium tetra(pentaflurorophenyl) boron, which ionize the neutral metallocene compound. Such ionizing compounds may contain an active proton, or some other cation associated with but not coordinated, or only loosely coordinated to the remaining ion of the ionizing ionic compound. Such compounds are described in EP-A-0520732, EP-A-0277003 and EP-A-0277004 published Aug. 3, 1988, and U.S. Pat. Nos. 5,153,157; 5,198,401; and 5,241,025. Further, the metallocene catalyst component can be a monocyclopentadienyl heteroatom containing compound. This heteroatom is activated by either an alumoxane or an ionic activator to form an active polymerization catalyst system to produce polymers useful in this invention. These types of catalyst systems are described in, for example, PCT International Publication WO 92/00333 published Jan. 9, 1992, U.S. Pat. Nos. 5,057,475; 5,096,867; 5,055,438 and 5,227,440 and EP-A-0420436, WO 91/04257. In addition, the metallocene catalysts useful in this invention can include non-cyclopentadienyl catalyst components, or ancillary ligands such as boroles or carbollides in combination with a transition metal. Additionally, it is not beyond the scope of this invention that the catalysts and catalyst systems may be those described in U.S. Pat. No. 5,064,802 and PCT publications WO 93/08221 and WO 93/08199 published Apr. 29, 1993. All the catalyst systems of the invention may be, optionally, prepolymerized or used in conjunction with an additive or scavenging component to enhance catalytic productivity.

Illustrative examples of the metallocenes are dialkyl metallocenes such as bis(cyclopentadienyl)titanium di-methyl, bis(cyclopentadienyl)hafnium dimethyl, bis(cyclopentadienyl)zirconium di-neopentyl, etc. Other examples of metallocenes which can be usefully employed are monocyclopentadienyl titanocenes such as, pentamethyl-cyclopentadienyl titanium trichloride, substituted bis(Cp)Ti(IV) compounds such as bis(indenyl) titanium diphenyl etc. Illustrative examples of the zirconocenes which can be usefully employed are, pentamethylcyclopentadienyl zirconium trichloride, etc. Mixed cyclopentadienyl metallocene compounds such as cyclopentadienyl (pentamethyl cyclopentadienyl)-zirconium dichloride, can be employed. Bis(cyclopentadienyl)hafnium dichloride, is illustrative of other metallocenes. Some preferred metallocenes are bis-(cyclopentadienyl)zirconium dimethyl; and the recemic and/or meso isomer of 1, 2-ethylene-bridged bis-(4, 5, 6, 7-tetrahydroindenyl) zirconium dichloride.

The alumoxane compounds useful in the polymerization process may be cyclic or linear. Cyclic alumoxanes may be represented by the general formula $(R-Al-O)_n$ while linear alumoxanes may be represented by the general formula $R(R-Al-O)_n'AlR_2$. In the general formula R is a $C_1-C_5$ alkyl group such as, for example, methyl, ethyl, propyl, butyl and pentyl, n is an integer of from 3 to 20, and n' is an integer from 1 to 20. Preferably, R is methyl and n and n' are 4–18. Generally, in the preparation of alumoxanes from, for example, aluminum trimethyl and water, a mixture of the linear and cyclic compounds is obtained. Preferably, they are prepared by contacting water with a solution of aluminum trialkyl, such as aluminum trimethyl in a suitable organic solvent such as toluene or an aliphatic hydrocarbon. The mole ratio of aluminum in the alumoxane to total metal in the metallocenes which can be usefully employed can be in the range of 0.5:1 to 1000:1, and desirably 1:1 to 100:1. Preferably, the mole ratio will be in the range of 50:1 to about 5:1 and most preferably 20:1 to 5:1. The solvents used in the preparation of the catalyst system are inert hydrocarbons, in particular a hydrocarbon that is inert with respect to the catalyst system. Such solvents include isobutane, butane, pentane, etc.

Polymerization is generally conducted at temperatures ranging between 20° and 300° C., preferably between 30° and 200° C. Reaction time is not critical and may vary from several hours or more to several minutes or less, depending upon factors such as reaction temperature, the monomers to be copolymerized, and the like. The skilled artisan may readily obtain the optimum reaction time for a given set of reaction parameters by routine experimentation. The catalyst systems described herein are suitable for the polymerization of olefins in solution over a wide range of pressures. Preferably, the polymerization will be completed at a pressure of 10 to 3,000 bar, and generally at a pressure within the range of 40 bar to 2,000 bar, and most preferably, the polymerization will be completed at a pressure within the range from 50 bar to 1,500 bar. After polymerization and, optionally, deactivation of the catalyst (e.g., by conventional techniques such as contacting the polymerization reaction medium with water or an alcohol, such as methanol, propanol, isopropanol, etc., or cooling or flashing the medium to terminate the polymerization reaction), the product polymer can be recovered by known processes. Excess reactants may be flashed off. The polymerization may be conducted employing liquid monomer, such as liquid propylene or mixtures of liquid monomers (such as mixtures of liquid propylene and 1-butene as the reaction medium. Alternatively, polymerization may be accomplished in the presence of a hydrocarbon inert to the polymerization such as butane, pentane, isopentane, hexane, isooctane, decane, toluene, xylene, and the like. In those situations wherein the molecular weight of the polymer product that would be produced at a given set of operating conditions is higher than desired, any of the techniques known in the art for control of molecular weight, such as the use of hydrogen and/or polymerization temperature control, may be used in the process of this invention. If so desired, the polymerization may be carried out in the presence of hydrogen to lower the polymer molecular weight. Care should be taken, however, to assure that terminal ethenylidene unsaturation is not reduced below the preferred level of at least 30% of the polymer chains.

However, since the preferred polymers are reactive polymers possessing ethenylidene-type terminal unsaturation, it is preferred to prepare the polymers in the substantial absence of added $H_2$ gas, that is, the absence of $H_2$ gas added in amounts effective to substantially reduce the polymer molecular weight. More preferably, the polymerizations will be conducted employing less than 5 wppm, and more preferably less than 1 wppm, of added $H_2$ gas, based on the moles of the ethylene monomer charged to the polymerization zone.

When carrying out the polymerization in a batch-type fashion, the reaction diluent (if any), and the ethylene and alpha-olefin comonomer(s) are charged at appropriate ratios to a suitable reactor.

The polymerization may be conducted in a continuous manner by simultaneously feeding the reaction diluent (if employed), monomers, catalyst and cocatalyst to a reactor and withdrawing solvent, unreacted monomer and polymer from the reactor so as to allow a residence time of ingredients long enough for forming polymer of the desired molecular weight and separating the polymer from the reaction mixture.

Polyisobutylene is a suitable backbone for the present invention because it is readily available by cationic polymerization from butene streams (e.g., using $AlCl_3$ catalysts). Such polyisobutylenes generally contain residual unsaturation in amounts of about one ethylenic double bond per polymer chain, positioned along the chain.

The polyisobutylene polymers employed are generally based on a hydrocarbon chain of from about 900 to 2500. Polyisobutylene having an Mn of less than about 300 tends to give poor performance when employed as dispersant because the molecular weight is insufficient to keep the dispersant molecule fully solubilized in lubricating oils. However, dispersants less than 300 molecular weight are suitable for 2-cycle engine applications. Methods for making polyisobutylene are known.

Other polymers, such as ethylene-alpha-olefin interpolymers having a number average molecular weight above 10,000 (e.g. 20,000 to 200,000) (e.g., ethylene-propylene copolymers and terpolymers containing non-conjugated dienes) are suitable polymers for the preparation of dispersants or multifunctional viscosity modifiers of the present invention. However, ethylene-alpha-olefin interpolymers of the above molecular weights could be produced using Ziegler-Natta catalysts only in combination with $H_2$ as molecular weight control in order to terminate the growing copolymer chains within this molecular weight range. Without use of $H_2$ or other conventional, so-called "chain-stoppers", the interpolymers produced with Ziegler-Natta catalysts would tend to have molecular weights greatly in excess of the above range. (Such higher copolymers, for example, are widely employed in ungrafted form as viscosity index improvers, (e.g., viscosity modifiers) and when undergo the Mannich Base reaction with heavy polyamine, as described below, can be employed as dispersant-viscosity index improver polymers. (e.g. multifunctional viscosity modifiers) The use of $H_2$ as a chain stopper has the disadvantage of causing the saturation of the olefinic double bond content of the copolymer and it is necessary to retain the unsaturation (i.e., double bonds) to practice this invention.

The high molecular weight ethylene/propylene copolymer and ethylene/propylene/diene terpolymers described above, having number average molecular weights of from 20,000 to 200,000, are generally produced employing Ziegler catalysts, generally $VCl_4$ or $VOCl_3$ with a halide source, such as organoaluminum halides and/or hydrogen halides. Such high molecular weight EP and EPDM polymers find use as viscosity modifiers and can be used as multifunctional viscosity modifiers by the present invention.

Hydroxy Aromatic Compounds

The hydroxy aromatic compounds useful in the preparation of the alkylated materials of this invention include those compounds having the formula:

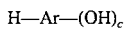
H—Ar—(OH)$_c$ wherein Ar represents

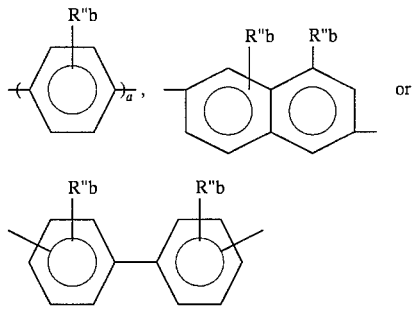

wherein a is 1 or 2, R" is independently a halogen radical such as the bromide or chloride radical, or a hydrocarbyl radical containing from 1 to about 10 carbon atoms, preferably an alkyl radical containing from 1 to about 10 carbon atoms, b is independently an integer from 0 to 2, and c is an integer from 1 to 2.

Illustrative of such Ar groups are phenylene, biphenylene, Naphthylene and the like.

Phenol is a preferred hydroxy aromatic compound. Catechol and naphthol are also useful hydroxy aromatic compounds in the practice of this invention.

Preparation of the Alkylated Hydroxy Aromatic Compounds

The selected hydrocarbon or polymer and hydroxy aromatic compound are contacted in the presence of a catalytically effective amount of at least one acidic alkylation catalyst under conditions effective to alkylate the aromatic group of the hydroxy aromatic compound. The alkylation catalyst is conventional and can comprise inorganic acids such as $H_3PO_4$, $H_2SO_4$, HF, $BF_3$, HF—$BF_3$ and the like. The acid catalyst can also comprise an acidic ion exchange resin having acidic groups adsorbed or absorbed thereon, such as Amberlyst 15 resin (Rohm & Haas Co.), and the like. Also useful as catalysts are preformed complexes (or complexes formed in situ) of the foregoing with $C_2$ to $C_{10}$ ethers, $C_1$ to $C_{10}$ alcohols, $C_2$ to $C_{10}$ ketones, phenols and the like, such as $BF_3$ complexed with dimethyl ether, diethyl ether, phenol, and the like. Even further useful are partially or completely dehydrated heteropoly catalysts as disclosed in U.S. Pat. No. 5,334,775. A heteropoly catalyst may exist as the free acid ("heteropoly acid") or salt ("heteropoly salt") of a heteropolyanion.

Heteropolyanions are polymeric oxoanions formed by a condensation reaction of two or more different oxoanions, as by

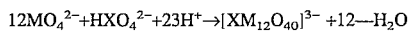
$$12MO_4^{2-}+HXO_4^{2-}+23H^+\rightarrow[XM_{12}O_{40}]^{3-}+12—H_2O$$

wherein M, known as the "poly-atom", is one or more Group VB or VIB transition metals (tungsten, molybdenum, vanadium, niobium, etc.) and X, known as the "heteroatom", represents one or more Group IVB transition metals (titanium, zirconium, etc.) or the metalloids and non-transition metals of Group IIIA to VIIA (boron, aluminum, silicon, phosphorous, germanium, arsenic, tin, tellurium, etc.).

The hydroxy aromatic compound and hydrocarbon or polymer will be generally contacted in a ratio of from about 0.1 to 10, preferably from about 1 to 7, more preferably from about 2 to 5, moles of the aromatic compound per mole of the hydrocarbon polymer. The selected acid catalyst can be employed in widely varying concentrations. Generally, when the acid catalyst comprises an inorganic catalyst, the acid catalyst will be charged to provide at least about 0.001, preferably from about 0.01 to 0.5, more preferably from about 0.1 to 0.3, moles of catalyst per mole of hydroxy aromatic compound charged to the alkylation reaction zone. Use of greater than 1 mole of the inorganic catalyst per mole of hydroxy aromatic compound is not generally required. When the acid catalyst comprises a supported catalyst, such as an acidic ion exchange resin, the reactants can be contacted with the ion exchange resin employing any conventional solid-liquid contacting techniques, such as by passing the reactants through the resin (e.g., in a catalyst bed or through a membrane impregnated or otherwise containing the resin catalyst) and the upper limit on the moles of catalyst employed per mole of hydroxy aromatic compound is not critical.

The temperature for alkylation can also vary widely, and will usually range from about 20° to 250° C., preferably from about 30° to 150° C., more preferably from about 50° to 80° C.

The alkylation reaction time can vary and will generally be from about 1 to 5 hours, although longer or shorter times can also be employed. The alkylation process can be practiced in a batchwise, continuous or semicontinuous manner. Preferably, the acid catalyst is neutralized and/or removed prior to contacting the alkylation product mixture with the heavy polyamine and aldehyde reactant. The neutralization can be accomplished by contacting the crude alkylation product with gaseous ammonia or other basically reacting compound (e.g., aqueous NaOH, KOH, and the like), followed by filtration to remove any precipitated neutralized catalyst solids.

Alkylation processes of the above types are known and are described, for example, in U.S. Pat. Nos. 3,539,633 and 3,649,229, the disclosures of which are hereby incorporated by reference.

The Aldehyde Material

The aldehyde reactants will generally comprise formaldehyde or paraformaldehyde, although it will be understood that other aldehyde-group containing compounds, such as $C_2$ to $C_{10}$ hydrocarbyl aldehydes (e.g., butyraldehyde, acetaldehyde, propionaldehyde, and the like) can also be employed. A preferred group of aldehyde materials are compounds of the formula:

R'''CHO wherein R''' is H or aliphatic hydrocarbon radical having from 1 to 4 carbon atoms.

U.S. Pat. Nos. 5,017,299, 5,186,851, and 5,268,115 disclose preparation of an alkylated hydroxy aromatic compounds, and subsequent condensation using the Mannich Base reaction and are incorporated herein by reference in their entirety for all purposes.

Dispersants Using Heavy Polyamines

It has been found that the amine segment of the dispersant is very critical both to product performance of the dispersants and that dispersants made from heavy polyamine are superior to dispersants made from conventional polyamine mixtures (PAM).

For example, as the molecular weight of a dispersant backbone is increased, the polar segment of the molecule becomes the limiting factor in dispersancy performance with polyamine systems of the prior art such as triethylenetetramine and tetraethylenepentamine. Increasing the stoichiometric ratio of amine to polymer raises the nitrogen content, but results in significant levels of free unreacted polyamine which is detrimental to diesel engine and elastomer seal performance.

Using amines higher than heavy polyamines of the present invention is detrimental because higher amines are insoluble or only partially soluble in oils and result in a hazy product in a lubricating oil composition. Amines higher than heavy polyamine comprise less than about 6.0 milliequivalents of primary amine per gram (alternatively an equivalent weight of primary amine greater than about 160 grams per equivalent) and greater than about 12 nitrogens per molecule.

Typical disclosures of polyamine reactants for the preparation of lubricant dispersants teach a range of nitrogens per molecule of from 1–12, a variety of spacing groups between the nitrogens, and a range of substitution patterns on the amine groups. We have discovered that dispersants derived from the preferred compositions described below exhibit surprisingly enhanced dispersancy relative to the prior art while retaining superior solubility in oil.

Specifically, one preferred embodiment of this invention comprises oil-soluble compositions obtained by the reaction of an alkyl-substituted hydroxy aromatic compound formed by the alkylation of at least one hydroxy aromatic compound, such as phenol, with at least one terminally unsaturated ethylene butene copolymer of 300 to 10,000 number average molecular weight, having at least 30% of said polymer's chains containing terminal ethenylidene unsaturation; further reacted with an aldehyde reactant, such as formaldehyde and heavy polyalkylene polyamines which contain >28% N (nitrogen), more preferably >30% N, e.g. >32% N, and an equivalent weight of primary amine groups of between 120–160 g/eq, more preferably 120–150 g/eq, e.g. 125–140 g/eq. Best results are obtained when the polyamines contain more than 6 nitrogen atoms per molecule on the average (more preferably 7 or more, e.g. >8 nitrogen atoms per molecule), and more than two primary amines per molecule on the average (preferably >2.2, e.g. >2.4). Good results are obtained when the spacings between the nitrogens are $C_2$–$C_3$. The heavy polyamine preferably comprises essentially no oxygen.

Polyamines with these characteristics are commercially available and can be produced by distilling out the tetraethylenepentamine and most of the pentaethylenehexamine fractions from standard polyethyleneamine mixtures. Alternatively, they could be synthesized by cyanoethylation of the primary amine groups of polyethylene or polypropylene pentamines or hexamines followed by hydrogenation.

Condensation Reaction

The Mannich Base condensate compositions of this invention are prepared by condensing at least one of the above described alkylated hydroxy aromatic compounds with a heavy polyamine in the presence of an aldehyde. The reactants are contacted for a time and under conditions sufficient to form the desired dispersant product.

The process employed in the condensation reaction can be any of those disclosed in U.S. Pat. Nos. 3,634,515; 3,649,229; 3,442,808; 3,798,165; 3,798,247; and 3,539,633, the disclosures of which are hereby incorporated by reference in their entirety.

The amount of the reactants employed is not critical and can vary over a wide range. It is, however, preferred to react the alkylated hydroxy aromatic compound, aldehyde reactant and heavy polyamine in the respective molar ratios of about 1:1.1–8:1–4. An excess of aldehyde reactant may be used. The reactions are exothermic, but it is desirable to heat the reaction to a temperature of above about 50° C., preferably in the range of from about 50°–140° C. This additional heating drives the reaction to completion and removes water from the resultant condensation reaction product.

The condensation reaction can be illustrated by the following reactions employing an heavy polyamine and formaldehyde:

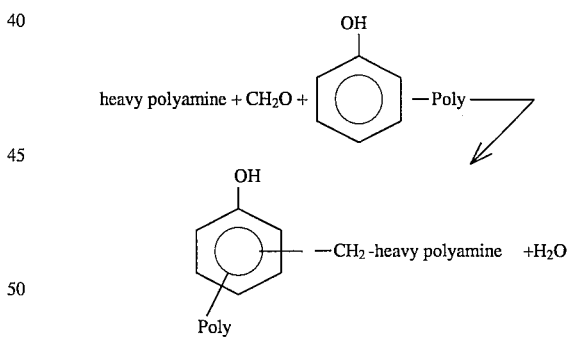

wherein "poly" is a hydrocarbon or polymer as described above, and

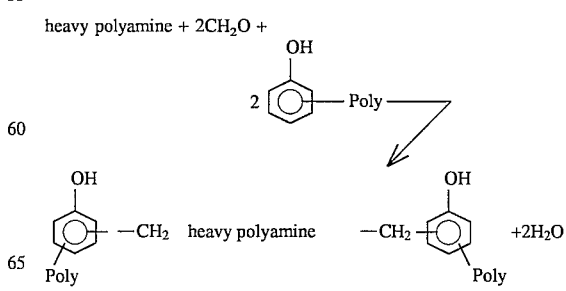

A preferred group of Mannich Base dispersants are those formed by condensing a polybutene or ethylene alpha olefin polymer, such as ethylene propylene copolymer or ethylene butene copolymer have a number average molecular weight of 300 to 10,000 and wherein said polymer has at least 30 percent of the polymer's claims containing terminal ethenylidene unsaturation—substituted phenol with formaldehyde and heavy polyamine.

One particularly preferred dispersant comprises a condensation of (A) ethylene-butene copolymer substituted phenol, (B) formaldehyde and (C) a heavy polyamine using about 1.1 to about 8 moles each of (B) and about 1 to about 4 moles of (C) per mole of (A).

The dispersant-forming reaction can be conducted in a polar or non-polar solvent (e.g., xylene, benzene and the like), and is preferably conducted in the presence of a mineral or synthetic lubricating oil.

The reaction product mixture comprising the desired Mannich Base condensation product formed by the process of this invention will generally be present in the condensation reaction product mixture in a concentration of at least about 60 wt. percent (e.g., from 65 to 95 wt. percent), more preferably at least about 70 wt. percent, (e.g., from 75 to 90 wt. percent). (i.e. conversion)

Another aspect of this invention involves the post treatment of the nitrogen containing dispersants. The process for post-treating said nitrogen containing dispersants is analogous to the post-treating processes used with respect to derivatives of conventional dispersants of the prior art. Accordingly, the same reaction conditions, ratio of reactants and the like can be used.

The nitrogen-containing dispersant of the instant invention as described above are post-treated by contacting said nitrogen-containing dispersant with one or more post-treating reagents selected from the group consisting of boron oxide, boron oxide hydrate, boron halides, boron acids, esters of boron acids, carbon disulfide, sulfur, sulfur chlorides, alkenyl cyanides, aldehydes, ketones, urea, thio-urea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyantes, epoxides, episulfides, formaldehyde or formaldehyde-producing compounds plus phenols, and sulfur plus phenols, and $C_1$ to $C_{30}$ hydrocarbyl substituted succinic acids and anhydrides (e.g., succinic anhydride, dodecyl succinic anhydride and the like), fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, and the like.

For example, the nitrogen containing dispersants can be treated with a boron compound selected from the class consisting of boron oxide, boron halides, boron acids and esters of boron acids in an amount to provide from about 0.1 atomic proportion of boron for each mole of said nitrogen composition to about 20 atomic proportions of boron for each atomic proportion of nitrogen of said nitrogen composition. Usefully, the borated materials of the invention contain from about 0.05 to 2.0 wt. percent, e.g., 0.05 to 0.7 wt. percent boron based on the total weight of said borated nitrogen-containing. The boron, which appears to be in the product as dehydrated boric acid polymers (primarily $HBO_2)_3$, is believed to attach to the dispersant as amine salts, e.g., the metaborate salt of said amine dispersants.

Treating is readily carried out by adding from about 0.05 to 4. e.g, 1. to 3 wt. percent (based on the weight of said nitrogen compound) of said boron compound, preferably boric acid which is most usually added as a slurry to said nitrogen compound and heating with stirring at from about 135° C. to 190°, e.g., 140°–170° C., for from 1 to 5 hours followed by nitrogen stripping at said temperature ranges.

The Mannich Base products of the present invention can also be treated with polymerizable lactones (such as epsilon-caprolactone) to form dispersant adducts.

Since post-treating processes involving the use of these post-treating reagents is known insofar as application to dispersants of the prior art, further descriptions of these processes herein is unnecessary. In order to apply the prior art processes to the compositions of this invention, all that is necessary is that reaction conditions, ratio of reactants, and the like as described in the prior art, be applied to the novel compositions of this invention.

Dispersants

Dispersants maintain oil insolubles, resulting from oil use, in suspension in the fluid thus preventing sludge flocculation and precipitation. Suitable dispersants include, for example, dispersants of the ash-producing (also known as detergents) and ashless type, the latter type being preferred. The Mannich Base polymer or hydrocarbon compositions of the present invention, can be used as dispersants and multifunctional viscosity index improvers in lubricant and fuel compositions.

The dispersants of the present invention can be incorporated into a lubricating oil in any convenient way. Thus, these mixtures can be added directly to the oil by dispersing or dissolving the same in the oil at the desired level of concentrations of the dispersant and detergent, respectively. Such blending into the additional lube oil can occur at room temperature or elevated temperatures. Alternatively, the dispersants can be blended with a suitable oil-soluble solvent and base oil to form a concentrate, and then blending the concentrate with a lubricating oil basestock to obtain the final formulation. Such dispersant concentrations will typically contain (on an active ingredient (A.I.) basis) from about 20 to about 60 wt. percent, and preferably from about 40 to about 50 wt. percent, dispersant additive, and typically from about 40 to 80 wt. percent, preferably from about 40 to 60 wt. percent, base oil, based on the concentrate weight. The lubricating oil basestock for the dispersant typically is adapted to perform a selected function by the incorporation of additional additives therein to form lubricating oil compositions (i.e., formulations).

Lubricating Compositions

The additives of the invention may be used by incorporation into an oleaginous material such as fuels and lubricating oils. Fuels include normally liquid petroleum fuels such as middle distillate boiling from 65° to 430° C., including kerosene, diesel fuels, home heating fuel oil, jet fuels, etc. A concentration of the additives in the fuel is in the range of typically from 0.001 to 0.5 wt. %, and preferably 0.005 to 0.15 wt. %, based on the total weight of the composition, will usually be employed.

The additives of the present invention may be used in lubricating oil compositions which employ a base oil in which the additives are dissolved or dispersed therein. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additive mixtures of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc. Alkylene oxide polymers and interpolymers and derivatives thereof where the terminal hydroxyl groups have been modified by esterification, etherification, etc., constitute another class of known synthetic lubricating oils. Another suitable class of synthetic lubricating oils comprises the esters of dicarboxylic acids. Esters useful as synthetic oils also include those made from $C_5$ to $C_{12}$ monocarboxylic acids and polyols and polyol ethers such as neopentyl glycol, etc. Silicon-based oils such as the polyalkyl-, polyaryl-, polyalkoxy-, or polyaryloxysiloxane oils and silicate oils comprise another useful class of synthetic lubricants. Unrefined, refined and rerefined oils can be used in the lubricants of the present invention.

The additives of the present invention, particularly those adapted for use as dispersants or viscosity modifiers, can be incorporated into a lubricating oil in any convenient way. Thus, they can be added directly to the oil by dispersing or dissolving the same in the oil. Such blending into the additional lube oil can occur at room temperature or elevated temperatures. Alternatively, the additives may be first formed into concentrates, which are in turn blended into the oil. Such dispersant concentrates will typically contain as active ingredient (A.I.), from 10 to 80 wt. %, typically 20 to 60 wt. %, and preferably from 40 to 50 wt. %, additive, (based on the concentrate weight) in base oil. MFVI concentrates typically will contain from 5 to 50 wt. % AI.

The additives of the invention may be mixed with other additives selected to perform at least one desired function. Typical of such additional additives are detergents, viscosity modifiers, wear inhibitors, oxidation inhibitors, corrosion inhibitors, friction modifiers, foam inhibitors, rust inhibitors, demulsifiers, antioxidants, lube oil flow improvers, and seal swell control agents.

Compositions, when containing these additives, typically are blended into the base oil in amounts which are effective to provide their normal attendant function. Representative effective amounts of such additives are illustrated as follows:

| Compositions | (Broad) Wt. % | (Preferred) Wt. % |
|---|---|---|
| V.I. Improver | 1–12 | 1–4 |
| Corrosion Inhibitor | 0.01–3 | 0.01–1.5 |
| Oxidation Inhibitor | 0.01–5 | 0.01–1.5 |
| Dispersant | 0.1–10 | 0.1–5 |
| Lube Oil Flow Improver | 0.01–2 | 0.01–1.5 |
| Detergents and Rust Inhibitors | 0.01–6 | 0.01–3 |
| Pour Point Depressant | 0.01–1.5 | 0.01–1.5 |
| Anti-Foaming Agents | 0.001–0.1 | 0.001–0.01 |
| Antiwear Agents | 0.001–5 | 0.001–1.5 |
| Seal Swellant | 0.1–8 | 0.1–4 |
| Friction Modifiers | 0.01–3 | 0.01–1.5 |
| Lubricating Base Oil | Balance | Balance |

When other additives are employed, it may be desirable, although not necessary, to prepare additive concentrates or packages comprising concentrated solutions or dispersions of the subject additives of this invention together with one or more of said other additives. Dissolution of the additive concentrate into the lubricating oil may be facilitated by solvents and by mixing accompanied with mild heating, but this is not essential. The final formulations may employ typically 2 to 20 wt. %, e.g. about 10 wt. %, of the additive package with the remainder being base oil.

All of said weight percents expressed herein (unless otherwise indicated) are based on active ingredient (A.I.) content of the individual additives, and the total weight of the additive package or formulation, which will include the weight of total oil or diluent.

EXAMPLES

The following examples are representative of the Mannich Base Dispersants derived from heavy polyamine. In the following examples ethylene content was determined by carbon-13 NMR and number average molecular weight by Gel Permeation Chromatography (GPC).

Preparation of the Alkylated Phenol

Example 1

An ethylene/propylene copolymer (47 percent ethylene, Mn=1300) was prepared via Ziegler-Natta polymerization with zirconium metallocene and methyl alumoxane cocatalyst according to known techniques and substantially in accordance with the following procedures. A 1 liter Zipperclave reactor (Autoclave Engineers) equipped with a water jacket for temperature control, with a septum inlet for syringe injection of catalyst, and with a supply of purified nitrogen, liquid propylene, and ethylene was used. The reactor was cleaned with hot toluene and then was purged well with dry nitrogen at 100° C. The reactor was cooled to 25° C. and 10.0 cc of a 4.0 wt. % toluene solution of methylalumoxane was injected along with 100 cc of distilled toluene at 0 psig under nitrogen. Liquid propylene monomer (200 cc) was added from a calibrated burette at 25° C. The reactor contents were stirred and heated to 115° C. at which point the reactor pressure was 375 psig. 1.00 cc of a toluene solution of bis(n-butylcyclopentadienyl) zirconium dichloride (1.00 mg) was injected and ethylene at a pressure of 405 psig was immediately supplied. Ethylene was fed on pressure demand in order to keep the system pressure at 405 psig. The rate of ethylene flow was recorded continuously during the course of the polymerization. The reaction was continued for 15 minutes after which the reaction was stopped by rapidly depressuring and cooling the reactor to 25° C. The polymer product was collected and the toluene solvent was evaporated in an air stream. The polymer was analyzed by GPC for number average molecular weight.

The copolymer was reacted with phenol in the presence of $BF_3$ substantially in accordance with the following procedures. About 50 g. of the ethylene-propylene copolymer was dissolved in 100 ml of chlorobenzene and added to a solution containing 10.45 g. of phenol in 300 ml of chlorobenzene. While stirring at room temperature under a nitrogen blanket, 0.5 g. of BF3 gas was bubbled into the charged solution, and the reaction mixture was stirred while the temperature was increased to 50° C. for about 1 hour. The reaction mixture was then neutralized with gaseous ammonia until a neutral pH was obtained. The solution was filtered and the filtrate was heated to 150° C. to distill of the solvent and excess phenol. Analytical results showed a 76% polymer conversion to the desired ethylene-propylene copolymer substituted phenol.

Example 2

An ethylene/propylene copolymer (45 percent ethylene, Mn=2000) prepared via Ziegler-Natta polymerization with zirconium metallocene and methyl alumoxane cocatalyst was prepared and then reacted with phenol in the presence of $BF_3$, using procedures substantially as described in example 1. The polymer conversion was 85 percent.

Example 3

An ethylene/propylene copolymer (41 percent ethylene, Mn=690) prepared via Ziegler-Natta polymerization with zirconium metallocene and methyl alumoxane cocatalyst was prepared and then reacted with phenol in the presence of $BF_3$, using procedures substantially as described in example 1. The polymer conversion was 85 percent.

Example 4

An ethylene/butene copolymer (45 percent ethylene, Mn=2400) prepared via Ziegler-Natta polymerization with zirconium metallocene and methyl alumoxane cocatalyst was prepared and then reacted with phenol in the presence of $BF_3$, using procedures substantially as described in example 1. The polymer conversion was 79 percent.

Example 5

An ethylene/butene copolymer (47 percent ethylene, Mn=1500) prepared via Ziegler-Natta polymerization with zirconium metallocene and methyl alumoxane cocatalyst was prepared and then reacted with phenol in the presence of $BF_3$, using procedures substantially as described in example 1. The polymer conversion was 83 percent.

Example 6

A Polyisobutylene polymer (Mn=2500) prepared according to known procedures was reacted with phenol to produce the alkylated phenol, using procedures substantially as described in example 1. The polymer conversion was 67 percent. The GPC of the alkylated product showed some degradation occurred. (Mn=2100)

Example 7

A Polyisobutylene polymer (Mn=2200) prepared according to known procedures was reacted with phenol to produce the alkylated phenol, using procedures substantially as described in example 1. The polymer conversion was 84 percent. The GPC of the alkylated product showed some degradation occurred. (Mn=1720).

Preparation of the Dispersant (Mannich Base Condensation)

Example 8

About 50 grams of the alkylated phenol prepared as in example 1 was dissolved in 51.1 grams of Exxon S150N lubricating oil and 50 grams of toluene. To the solution was added 3.57 grams (0.027 eq. grams of primary nitrogen) of HA-2 heavy polyamine and heated to 80° C. while stirring under nitrogen atmosphere. Then 3.3 grams of formalin were added and the mixture was soaked at 80° C. for one hour. After one hour, the reaction temperature was raised to 130° C. and kept for two hours. The reaction temperature was increased to 150° C. and the reaction product was stripped with nitrogen at 150° C. for one hour. The solution analyzed for 1.10 percent nitrogen (N) and a kinematic viscosity at 100° C. of 301 cst.

Example 9 (Comparative)

About 50 grams of the alkylated phenol prepared as in example 1 was dissolved in 50.4 grams of S150N lubricating oil and 50 grams of toluene. To the solution was added 3.1 grams (0.027 eq. grams of primary nitrogen) of polyamine (PAM) and heated to 80° C. while stirring under nitrogen atmosphere. Then 3.3 grams of formalin were added and the mixture was soaked at 80° C. for one hour. After one hour, the reaction temperature was raised to 130° C. and kept for two hours. The reaction temperature was increased to 150° C. and the reaction product was stripped with nitrogen at 150° C. for one hour. The solution analyzed for 1.00 percent N and a kinematic viscosity at 100° C. of 284 cst.

Example 10

About 50 grams of the alkylated phenol prepared as in example 2 was dissolved in 60.9 grams of S150N lubricating oil and 50 grams of toluene. To the solution was added 2.7 grams (0.021 eq. grams of primary nitrogen) of HA-2 heavy polyamine and heated to 80° C. while stirring under nitrogen atmosphere. Then 2.5 grams of formalin were added and the mixture was soaked at 80° C. for one hour. After one hour, the reaction temperature was raised to 130° C. and kept for two hours. The reaction temperature was increased to 150° C. and the reaction product was stripped with nitrogen at 150° C. for one hour. The solution analyzed for 0.89 percent N and a kinematic viscosity at 100° C. of 396 cst.

Example 11 (Comparative)

About 50 grams of the alkylated phenol prepared as in example 2 was dissolved in 60.4 grams of S150N lubricating oil and 50 grams of toluene. To the solution was added 2.4 grams (0.021 eq. grams of primary nitrogen) of PAM and heated to 80° C. while stirring under nitrogen atmosphere. Then 2.5 grams of formalin were added and the mixture was soaked at 80° C. for one hour. After one hour, the reaction temperature was raised to 130° C. and kept for 2 hours. The reaction temperature was increased to 150° C. and the reaction product was stripped with nitrogen at 150° C. for one hour. The solution analyzed for 0.75 percent N and a kinematic viscosity at 100° C. of 365 cst.

Example 12

About 50 grams of the alkylated phenol prepared as in example 3 was dissolved in 69.6 grams of S150N lubricating oil and 50 grams of toluene. To the solution was added 7.1 grams (0.055 eq. grams of primary nitrogen) of HA-2 heavy polyamine and heated to 80° C. while stirring under nitrogen atmosphere. Then 6.6 grams of formalin were added and the mixture was soaked at 80° C. for one hour. After one hour, the reaction temperature was raised to 130° C. and kept for two hours. The reaction temperature was increased to 150° C. and the reaction product was stripped with nitrogen at 150° C. for one hour. The solution analyzed for 1.74 percent N and a kinematic viscosity at 100° C. of 44 cst.

Example 13 (Comparative)

About 50 grams of the alkylated phenol prepared as in example 3 was dissolved in 68.4 grams of S150N lubricating oil and 50 grams of toluene. To the solution was added 6.3 grams (0.055 eq. grams of primary nitrogen) of PAM and heated to 80° C. while stirring under nitrogen atmosphere. Then 3.3 grams of formalin were added and the mixture was soaked at 80° C. for one hour. After one hour, the reaction temperature was raised to 130° C. and kept for two hours. The reaction temperature was increased to 150° C. and the reaction product was stripped with nitrogen at 150° C. for one hour. The solution analyzed for 1.50 percent N and a kinematic viscosity at 100° C. of 38 cst.

Example 14

About 50 grams of the alkylated phenol prepared as in example 4 was dissolved in 60.0 grams of S150N lubricating oil and 50 grams of toluene. To the solution was added 2.1 grams (0.016 eq. grams of primary nitrogen) of HA-2 heavy polyamine and heated to 80° C. while stirring under nitrogen atmosphere. Then 1.9 grams of formalin were added and the mixture was soaked at 80° C. for one hour. After one hour, the reaction temperature was raised to 130° C. and kept for two hours. The reaction temperature was increased to 150° C. and the reaction product was stripped with nitrogen at 150° C. for one hour. The solution analyzed for 0.69 percent N and a kinematic viscosity at 100° C. of 178 cst.

Example 15 (Comparative)

About 50 grams of the alkylated phenol prepared as in example 4 was dissolved in 59.5 grams of S150N lubricating oil and 50 grams of toluene. To the solution was added 1.8 grams (0.016 eq. grams of primary nitrogen) of PAM and heated to 80° C. while stirring under nitrogen atmosphere. Then 1.9 grams of formalin were added and the mixture was soaked at 80° C. for one hour. After one hour, the reaction temperature was raised to 130° C. and kept for two hours. The reaction temperature was increased to 150° C. and the reaction product was stripped with nitrogen at 150° C. for one hour. The solution analyzed for 0.63 percent N and a kinematic viscosity at 100° C. of 173 cst.

Example 16

About 50 grams of the alkylated phenol prepared as in example 5 was dissolved in 60.0 grams of S150N lubricating oil and 50 grams of toluene. To the solution was added 3.4 grams (0.026 eq. grams of primary nitrogen) of HA-2 heavy polyamine and heated to 80° C. while stirring under nitrogen atmosphere. Then 3.2 grams of formalin were added and the mixture was soaked at 80° C. for one hour. After one hour, the reaction temperature was raised to 130° C. and kept for two hours. The reaction temperature was increased to 150° C. and the reaction product was stripped with nitrogen at 150° C. for one hour. The solution analyzed for 0.99 percent N and a kinematic viscosity at 100° C. of 107 cst.

Example 17 (Comparative)

About 50 grams of the alkylated phenol prepared as in example 5 was dissolved in 59.3 grams of S150N lubricating oil and 50 grams of toluene. To the solution was added 3.0 grams (0.026 eq. grams of primary nitrogen) of PAM and heated to 80° C. while stirring under nitrogen atmosphere. Then 3.2 grams of formalin were added and the mixture was soaked at 80° C. for one hour. After one hour, the reaction temperature was raised to 130° C. and kept for two hours. The reaction temperature was increased to 150° C. and the reaction product was stripped with nitrogen at 150° C. for one hour. The solution analyzed for 0.89 percent N and a kinematic viscosity at 100° C. of 101 cst.

Example 18

About 50 grams of the alkylated phenol prepared as in example 6 was dissolved in 37.6 grams of S150N lubricating oil and 50 grams of toluene. To the solution was added 2.3 grams (0.018 eq. grams of primary nitrogen) of HA-2 heavy polyamine and heated to 80° C. while stirring under nitrogen atmosphere. Then 1.63 grams of formalin were added and the mixture was soaked at 80° C. for one hour. After one hour, the reaction temperature was raised to 130° C. and kept for two hours. The reaction temperature was increased to 150° C. and the reaction product was stripped with nitrogen at 150° C. for one hour. The solution analyzed for 0.86 percent N and a kinematic viscosity at 100° C. of 443 cst.

Example 19 (Comparative)

About 50 grams of the alkylated phenol prepared as in example 6 was dissolved in 36.8 grams of S150N lubricating oil and 50 grams of toluene. To the solution was added 2.1 grams (0.018 eq. grams of primary nitrogen) of PAM and heated to 80° C. while stirring under nitrogen atmosphere. Then 1.63 grams of formalin were added and the mixture was soaked at 80° C. for one hour. After one hour, the reaction temperature was raised to 130° C. and kept for 2 hours. The reaction temperature was increased to 150° C. and the reaction product was stripped with nitrogen at 150° C. for one hour. The solution analyzed for 0.61 percent N and a kinematic viscosity at 100° C. of 431 cst.

Example 20

About 50 grams of the alkylated phenol prepared as in example 7 was dissolved in 63.3 grams of S150N lubricating oil and 50 grams of toluene. To the solution was added 3.7 grams (0.028 eq. grams of primary nitrogen) of HA-2 heavy polyamine and heated to 80° C. while stirring under nitrogen atmosphere. Then 3.5 grams of formalin were added and the mixture was soaked at 80° C. for one hour. After one hour, the reaction temperature was raised to 130° C. and kept for two hours. The reaction temperature was increased to 150° C. and the reaction product was stripped with nitrogen at 150° C. for one hour. The solution analyzed for 1.26 percent N and a kinematic viscosity at 100° C. of 172 cst.

Example 21 (Comparative)

About 50 grams of the alkylated phenol prepared as in example 7 was dissolved in 60.7 grams of S150N lubricating oil and 50 grams of toluene. To the solution was added 3.3 grams (0.028 eq. grams of primary nitrogen) of PAM and heated to 80° C. while stirring under nitrogen atmosphere. Then 3.5 grams of formalin were added and the mixture was soaked at 80° C. for one hour. After one hour, the reaction temperature was raised to 130° C. and kept for two hours. The reaction temperature was increased to 150° C. and the reaction product was stripped with nitrogen at 150° C. for one hour. The solution analyzed for 0.97 percent N and a kinematic viscosity at 100° C. of 130 cst.

In the above examples the polyamine (PAM) used had a total weight percent nitrogen of 33.5. In the above examples the HA-2 heavy polyamine used had a total weight percent nitrogen of 32.8.

SLUDGE BENCH TEST RESULTS

SIB (Sludge Inhibition Bench Test)

The SIB test forecasts the performance of a lubricant in a gasoline engine. The test is described below:

The SIB test employs a used crankcase mineral lubricating oil composition having an original viscosity of about 325 SSU at 37.8° C. that has been used in a taxicab driven generally for short trips only thereby causing a build up of a high concentration of sludge precursors. The oil used contains only a refined base mineral oil, a viscosity index improver, a pour point depressant and a zinc dialkyldithiophosphate antiwear additive. The oil contains no sludge dispersants. Such used oil is acquired by draining and refilling taxicab crankcases at about 1,000–2,000 mile intervals.

The SIB test is conducted in the following manner: The used crankcase oil is freed of sludge by centrifuging for one half hour at about 39,000 gravities (gs). The resulting clear bright red oil is then decanted from the insoluble sludge particles. However, the supernatant oil still contains oil-soluble sludge precursors which, under the conditions employed by this test, will tend to form additional oil-insoluble deposits of sludge. The sludge inhibiting properties of the additives being tested are determined by adding to portions of the used oil 0.5 wt. %, on an active basis, of the particular additive being tested. Ten grams of each oil sample being tested is placed in a stainless steel centrifuge tube and is heated at 140° C. for 16 hrs. in the presence of air. Following the heating, the tube containing the oil being tested is cooled and then centrifuged for 30 min. at about 39,000 gs. Any deposits of new sludge that form in this step are separated from the oil by decanting supernatant oil and then carefully washed with 15 ml. of pentane to remove all remaining oils from the sludge. The weight, in milligrams, of the new solid sludge that forms in the test is determined by drying the residue and weighing it. The results are reported as milligrams of sludge per ten grams of sludge, thus measuring differences as small as one part per ten thousand. The less new sludge formed, the more effective is the additive as a dispersant. In other words, if the additive is effective, it will hold at least a portion of the new sludge that forms on heating and oxidation, stably suspended in the oil so that it does not precipitate during the centrifuging period.

Samples of the dispersants prepared as set forth in Examples 8–21 above were subjected to the standard sludge inhibition bench test (SIB).

The following SIB test results indicate the improved dispersancy performance of the Mannich Base dispersants prepared from Heavy Polyamine (HA-2) when compared to those derived from the corresponding polymers using conventional polyamine (PAM).

| Sludge Bench Test Results (SIB) | | | | | |
|---|---|---|---|---|---|
| Example | Polymer Concentration | Polymer MW | Amine type | SIB (mg sludge/ 10 mg sludge in the blank) Concentration | |
| | | | | 0.2% | 0.4% |
| 8 | EP | 1300 | HA-2 | 3.13 | 1.20 |
| 9 | EP | 1300 | PAM | 1.84 | 1.29 |
| 10 | EP | 2000 | HA-2 | 3.50 | 0.93 |
| 11 | EP | 2000 | PAM | 4.60 | 1.11 |
| 12 | EP | 690 | HA-2 | 4.42 | 1.60 |
| 13 | EP | 690 | PAM | 5.77 | 3.96 |
| 14 | EB | 2400 | HA-2 | 6.63 | 3.64 |
| 15 | EB | 2400 | PAM | 7.49 | 4.59 |
| 16 | EB | 1500 | HA-2 | 6.11 | 4.10 |
| 17 | EB | 1500 | PAM | 5.68 | 4.80 |
| 18 | PIB | 2500 | HA-2 | 6.68 | 5.70 |
| 19 | PIB | 2500 | PAM | 7.26 | 5.98 |
| 20 | PIB | 2200 | HA-2 | 4.71 | 2.65 |
| 21 | PIB | 2200 | PAM | 6.15 | 3.73 |
| Reference | PIBSA-PAM | 2225 | PAM | 6.45 | |
| blank (oil) | | | | 10.00 | 10.00 |

In general, SIB results indicate that dispersants made from HA-2 heavy polyamine have superior sludge dispersancy properties than those made from commercial PAM at equivalent active ingredient. Lower values for the SIB indicate better dispersancy performance.

What is claimed is:

1. An oil soluble dispersant additive composition comprising a condensation product obtained by the reaction of:
   (a) at least one alkyl-substituted hydroxy aromatic compound formed by the alkylation of at least one hydroxy aromatic compound with at least one compound containing a carbon-carbon double bond selected from the group consisting of hydrocarbons and polymers;
   (b) at least one aldehyde reactant; and
   (c) a heavy polyamine, wherein said heavy polyamine has an average of at least about 7 nitrogens per molecule and an equivalent weight of about 120–160 grams per equivalent of primary amine.

2. The dispersant of claim 1, wherein said compound containing a carbon-carbon double bond is a polymer.

3. The dispersant of claim 2, wherein said polymer comprises polybutene.

4. The dispersant of claim 2, wherein said polymer comprises ethylene/alpha-olefin copolymer.

5. The dispersant of claim 4, wherein said polymer comprises ethylene/propylene or ethylene/butene copolymer.

6. The dispersant of claims 3 or 4, wherein said polymer has a number average molecular weight greater than 300.

7. The dispersant of claims 3 or 4, wherein said polymer has a number average molecular weight from about 300 to about 20,000.

8. The dispersant of claim 4, wherein said polymer has a number average molecular weight from about 20,000 to about 500,000.

9. The dispersant of claim 1, wherein said heavy polyamine comprises substantially no oxygen.

10. The dispersant of claim 1, wherein said heavy polyamine has at least about 28 wt. percent nitrogen.

11. The dispersant of claim 1, wherein said heavy polyamine has an equivalent weight of about 125–140 grams per equivalent of primary amine.

12. The product of claim 1, wherein said heavy polyamine has a primary amine content of at least about 6.3 to about 8.5 milliquivalents of primary-amine per gram and a total nitrogen content of at least about 32 wt. percent.

13. The dispersant of claim 1, wherein said heavy polyamine comprises less than about 1 wt. percent pentamines and lower polyamines and less than about 25 wt. percent hexamines.

14. The dispersant of claim 1, wherein said hydroxy aromatic compound comprises phenol.

15. The dispersant of claim 1, wherein said aldehyde reactant comprises formaldehyde.

16. A lubricating oil composition comprising the additive of claim 1.

17. A lubricating oil composition comprising the additive of claim 1 and a base oil in the form of a lubricating oil or lubricating oil additive package.

18. An additive for use in a lubricant comprising the dispersant of claim 1.

19. An oil soluble dispersant additive composition comprising a condensation product obtained by the reaction of:

(a) at least one alkyl-substituted hydroxy aromatic compound formed by the alkylation of at least one compound containing a carbon-carbon double bond selected from the group consisting of hydrocarbons and polymers with a hydroxy aromatic compound represented by the formula:

wherein Ar is selected from the group consisting of:

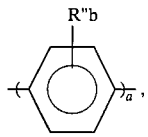,

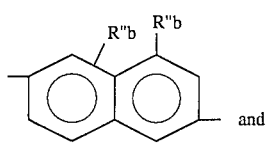 and

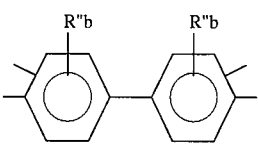

wherein a is 1 or 2, R" is independently a halogen radical or a hydrocarbyl radical containing from 1 to about 10 carbon atoms, b is independently an integer from 0 to 2, and c is an integer from 1 to 2;

(b) at least one aldehyde reactant selected from the group consisting of:
1. paraformaldehyde,
2. $C_2$ to $C_{10}$ hydrocarbyl aldehyde, and
3. aldehyde compounds of the formula:

wherein R'" is H or an aliphatic hydrocarbon radical having 1 to 4 carbon atoms; and (c) at least one heavy polyamine, wherein said heavy polyamine has an average of at least about 7 nitrogens per molecule and an equivalent weight of about 120–160 grams per equivalent of primary amine.

20. A process for producing an oil soluble dispersant additive composition comprising the steps of:

(a) contacting at least one alkyl-substituted hydroxy aromatic compound formed by the alkylation of at least one hydroxy aromatic compound formed by the alkylation of at least one hydroxy aromatic compound with at least one compound containing a carbon-carbon double bond selected from the group consisting of hydrocarbons and polymers; with (b) at least one aldehyde reactant; and (c) at least one heavy polyamine, under condensation conditions to form said dispersant additive, wherein said heavy polyamine has an average of at least about 7 nitrogens per molecule and an equivalent weight of about 120–160 grams per equivalent of primary amine.

* * * * *